(12) United States Patent
Van Berge et al.

(10) Patent No.: US 6,806,226 B2
(45) Date of Patent: Oct. 19, 2004

(54) COBALT CATALYSTS

(75) Inventors: Peter Jacobus Van Berge, Sasolburg (ZA); Jan Van De Loosdrecht, Sasolburg (ZA); Jacobus Lucas Visagie, Sasolburg (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 0 days.

(21) Appl. No.: 10/159,970

(22) Filed: May 31, 2002

(65) Prior Publication Data

US 2003/0125201 A1 Jul. 3, 2003

Related U.S. Application Data

(63) Continuation of application No. PCT/IB00/01745, filed on Nov. 24, 2000.
(60) Provisional application No. 60/168,604, filed on Dec. 1, 1999.

(51) Int. Cl.[7] ............ B01J 23/40; B01J 23/42; B01J 21/00; B01J 29/00
(52) U.S. Cl. .......... 502/326; 502/327; 502/260; 502/74; 502/66
(58) Field of Search ............ 502/326, 327, 502/260, 74, 66

(56) References Cited

U.S. PATENT DOCUMENTS

| | | | | |
|---|---|---|---|---|
| 5,718,844 A | * | 2/1998 | Krynitz et al. ........... 252/513 |
| 5,725,699 A | * | 3/1998 | Hinshaw et al. ......... 149/19.1 |
| 5,733,839 A | * | 3/1998 | Espinoza et al. ........ 502/336 |
| 6,090,742 A | * | 7/2000 | Culross ................... 502/258 |
| 6,096,790 A | * | 8/2000 | Zennaro et al. ......... 518/715 |
| 6,100,304 A | * | 8/2000 | Singleton et al. ....... 518/715 |
| 6,103,213 A | * | 8/2000 | Nakamura et al. ...... 423/592 |
| 6,130,184 A | * | 10/2000 | Geerlings et al. ....... 502/350 |
| 6,156,694 A | * | 12/2000 | Harper .................... 502/301 |
| 6,162,373 A | * | 12/2000 | Koveal, Jr. .............. 252/373 |
| 6,218,046 B1 | * | 4/2001 | Tanigawa et al. ....... 429/223 |
| 6,235,798 B1 | * | 5/2001 | Roy et al. ............... 518/715 |
| 6,262,132 B1 | * | 7/2001 | Singleton et al. ....... 518/715 |
| 6,313,062 B1 | * | 11/2001 | Krylova et al. ......... 502/326 |
| 6,455,462 B2 | * | 9/2002 | Van Berge et al. ..... 502/325 |
| 6,482,766 B1 | * | 11/2002 | Chaumetter et al. .... 502/242 |

FOREIGN PATENT DOCUMENTS

| | | |
|---|---|---|
| EP | 0421502 | 4/1991 |
| EP | 0496448 | 7/1992 |
| EP | 0736326 | 10/1996 |
| WO | 9934917 | 7/1999 |
| WO | 9942214 | 8/1999 |
| WO | 0020116 | 4/2000 |

OTHER PUBLICATIONS

Msuldin, Charles H., et al. "Rhenium as a promoter of titania–supported cobalt Fischer–Tropsch catalysts." Studies in Surface Science and Catalysts (2001) pp 417–422.

* cited by examiner

*Primary Examiner*—Cam N. Nguyen
(74) *Attorney, Agent, or Firm*—Ladas & Parry

(57) ABSTRACT

A cobalt catalyst precursor includes a catalyst support impregnated with cobalt. All reducible cobalt is present in the support as supported cobalt oxide of formula-unit $CoO_aH_b$, where $a \geq 1,7$ and $b \geq 0$. A process for preparing a cobalt catalyst precursor, and a process for preparing a cobalt catalyst are also provided.

24 Claims, 9 Drawing Sheets

COBALT CATALYSTS

This application is a continuation of copending International Application PCT/IB00/01745 filed on 24 Nov. 2000, which designated the U.S., claims the benefit thereof provisional application No.60/168,604, filed Dec. 1, 1999 and incorporates the same by reference.

THIS INVENTION relates to cobalt catalysts. It relates in particular to a cobalt catalyst precursor, to a process for preparing a cobalt catalyst precursor, and to a process for preparing a cobalt catalyst.

Processes for preparing cobalt catalysts are, in general, well defined in the literature. For example, U.S. Pat. No. 5,733,839 describes a process for preparing an impregnated Fischer-Tropsch catalyst comprising an alumina carrier and an active component selected from the group consisting of cobalt, iron and mixtures thereof. However, it is an object of the present invention to provide a supported cobalt catalyst having higher productivities than known cobalt catalysts.

Thus, according to a first aspect of the invention, there is provided a cobalt catalyst precursor which includes a catalyst support impregnated with cobalt, with all reducible cobalt being present in the support as supported cobalt oxide of formula-unit $CoO_aH_b$, where $a \geq 1{,}7$ and $b \geq 0$.

In other words, according to the first aspect of the invention, there is provided a cobalt catalyst precursor which includes a catalyst support that has been impregnated with cobalt and calcined in such a manner that all reducible cobalt present therein, ie cobalt that is associated with the elements hydrogen and oxygen in the absence of cobalt-support interaction, such as the formation of cobalt aluminates or cobalt silicates, that would decrease its reducibility, is present as the supported cobalt oxide of formula-unit $CoO_aH_b$, where $a \geq 1{,}7$ and $b \geq 0$.

Thus, for example, all the reducible cobalt could be present as $Co_2O_3.H_2O$ or $CoO(OH)$, ie where $a=2$ and $b=1$. However, instead, the reducible cobalt may be present, for example, as a mixture of $Ci_3O_4$ and $CoO(OH)$ or $Co_2O_3.H_2O$ with 45% of the reducible cobalt in the catalyst precursor being present as $Co_3O_4$ and 55% of the reducible cobalt being present as $CoO(OH)$ or $Co_2O_3.H_2O$. This would result in a catalyst precursor in which all the reducible cobalt is present as supported cobalt oxide of formula-unit $CoO_aH_b$ where $a=1{,}7$ and $b=0{,}55$. Another example would be a mixture of $Co_2O_3$ and $CoO(OH)$ or $Co_2O_3.H_2O$ with 60% of the reducible cobalt being present as $Co_2O_3$ and 40% of the reducible cobalt being present as $CoO(OH)$ or $Co_2O_3.H_2O$. This would result in a catalyst precursor in which all of the reducible cobalt is present as supported cobalt oxide of formula-unit $CoO_aH_b$ where $a=1{,}7$ and $b=0{,}4$.

The catalyst precursor may contain between 5 gCo/100 g support and 70 gCo/100 g support, preferably between 20 gCo/100 g support and 50 gCo/100 g support, more preferably between 25 gCo/100 g support and 40 gCo/100 g support.

According to a second aspect of the invention, there is provided a process for preparing a cobalt catalyst precursor, which process includes in a support impregnation stage, impregnating a particulate porous catalyst support with a cobalt salt, and partially drying the impregnated support; and in a calcination stage, calcining the partially dried impregnated support to obtain the cobalt catalyst precursor, with the calcination being effected at calcination conditions selected so that all reducible cobalt is present in the support as a supported cobalt oxide of formula-unit $CoO_aH_b$, where $a \geq 1{,}7$ and $b \geq 0$.

The resultant cobalt catalyst precursor will, in practice, be reduced to obtain a cobalt catalyst, which will thus have enhanced productivities as compared to catalysts of which $Co_3O_4$ is the preferred product of calcination.

According to a third aspect of the invention, there is provided a process for preparing a cobalt catalyst, which process includes in a support impregnation stage, impregnating a particulate porous catalyst support with a cobalt salt, and partially drying the impregnated support;

in a calcination stage, calcining the partially dried impregnated support to obtain a cobalt catalyst precursor, with the calcination being effected at calcination conditions selected so that all reducible cobalt is present in the support as a supported cobalt oxide of formula-unit $CoO_aH_b$, where $a \geq 1{,}7$ and $b \geq 0$; and in a reduction stage, reducing the cobalt catalyst precursor, to obtain the cobalt catalyst.

The cobalt salt may, in particular, be cobalt nitrate, $Co(NO_3)_2.6H_2O$.

Any commercially available porous oxide catalyst support, such as alumina ($Al_2O_3$), silica ($SiO_2$), titania ($TiO_2$), magnesia (MgO), and silica-alumina, may be used. The support preferably has an average pore diameter between 8 and 50 nanometers, more preferably between 10 and 15 nanometers. The support pore volume may be between 0,1 and 1,0 ml/g, preferably between 0,3 and 0,9 ml/g. The average particle size is preferably between 1 and 500 micrometers, more preferably between 10 and 250 micrometers, still more preferably between 45 and 200 micrometers.

The support may be a protected modified catalyst support, containing, for example, silicon as a modifying component, as described in WO 99/42214, which is hence incorporated herein by reference.

The impregnation of the catalyst support may, in principle, be effected by any known impregnation method or procedure such as incipient wetness impregnation or slurry phase impregnation. However, the impregnation stage may, in particular, comprise a process as described in WO 00/20116, and which is thus incorporated herein by reference. The support impregnation stage may thus involve a 2-step slurry phase impregnation process, -which is dependent on a desired cobalt loading requirement and the pore volume of the catalyst support.

During either of the two slurry phase impregnation steps, a water soluble precursor salt of palladium (Pd), platinum (Pt), ruthenium (Ru), or mixtures thereof, may be added, as a dopant capable of enhancing the reducibility of the cobalt. The mass proportion of the palladium, platinum or ruthenium metal, or the combined mixture of such metals when such a mixture is used, to the cobalt metal may be between 0,01:100 to 0,3:100.

The support impregnation and drying may typically be effected in a conical vacuum drier with a rotating screw or in a tumbling vacuum drier.

In the calcination stage, the calcination may include passing hot air over and around the partially dried impregnated support, thereby drying the impregnated support further by removal of residual moisture present therein; and calcining the resultant dried impregnated support by decomposition of the cobalt salt into decomposition products comprising oxide(s) and any water of hydration, with the decomposition products being released in vapour form, to enhance formation of a supported catalyst precursor containing the supported cobalt oxide of formula-unit $CoO_aH_b$, where $a \geq 1{,}7$ and $b \geq 0$.

In particular, since the cobalt salt is cobalt nitrate, the oxide (s) can be nitrogen dioxide, an equilibrium between $NO_2$ and $N_2O_4$, as well as nitric oxide (NO).

The process may include diluting the decomposition products that are obtained during the calcination. In other words, formation of the supported cobalt oxide, with the formula-unit $CoO_aH_b$, where $a \geq 1,7$ and $b \geq 0$, is enhanced by ensuring dilution of the decomposition products during calcination.

The presence of the supported cobalt oxide phase with the formula-unit $CoO_aH_b$, where $a \geq , 7$ and $b \geq 0$, may be determined by using Temperature Programmed Reduction (TPR) as fingerprint technique.

The minimum temperature at which the calcination is performed is the temperature at which decomposition of the cobalt precursor, ie the cobalt salt, starts, while the maximum calcination temperature is the temperature at which the preferred supported cobalt oxide phase with the formula-unit $CoO_aH_b$, where $a \geq 1,7$ and $b \geq 0$, is converted to the undesired $Co_3O_4$ spinel phase.

The calcination may be performed in any known calcination equipment such as a fluidized bed calciner, a rotary kiln, torbed calciner or a furnace.

In particular, the calcination may be performed in a fluidized bed calciner. Preferably, the calcination is performed in air, at temperatures between 95° C. and 400° C. The minimum calcination temperature is thus determined by the temperature at which nitrate decomposition starts, ie about 120° C., while the maximum calcination temperature is the temperature at which the preferred cobalt oxide with the formula-unit $CoO_aH_b$, is converted into the undesired $Co_3O_4$ spinel phase. The maximum calcination temperature is typically between 200 and 300° C. After calcination, the nitrogen concentration in the catalyst precursor is preferably less than 1,0 m %.

In a preferred embodiment of the invention, the removal of the nitrogen oxide(s) and water during the calcination in air is enhanced, to stabilize the supported cobalt oxide phase of formula-unit $CoO_aH_b$, where $a \geq 1,7$ and $b \geq 0$.

During the calcination in the fluidized bed, the heating rate of the impregnated and dried support and the space velocity of the air may be controlled such that the residual moisture in the support is first driven off, whereafter decomposition of the cobalt nitrate is effected.

Preferably a minimum air space velocity is used in order to attain a maximum relative intrinsic cobalt catalyst activity in respect of the resultant catalyst; however, a maximum heating rate is associated with the minimum space velocity. In particular, the Applicant has found that for a particular support impregnated with cobalt nitrate, there is a minimum air space velocity, 1,0 $m_n^3$/(kg $Co(NO_3)_2.6H_2O$)/h, which must be used in order to attain the maximum relative intrinsic catalyst activity. If a space velocity lower than 1,0 $m_n^3$/kg $Co(NO_3)_2.6H_2O$)/h, is used, the maximum initial activity of the resultant catalyst will thus not be attainable. However, the Applicant has also found that there is then a maximum heating rate of 1° C./min, preferably 0,5° C./min, and typically between 0,1 and 0,5° C./min, associated with the minimum space velocity, 1,0 $m_n^3$/(kg $Co(NO_3)_2.6H_2O$)/h. In other words, if the support heating rate exceeds 1° C./min while maintaining a minimum space velocity of 1,0 $m_n^3$/(kg $Co(NO_3)_2.6H_2O$)/h, then this will have a detrimental influence on the initial activity.

However, if a space velocity greater than 1,0 $m_n^3$/(kg $Co(NO_3)_2.6H_2O$)/h is used, say a space velocity of 1000 $m_n^3$/(kg $Co(NO_3)_2.6H_2O$)/h), then there will be a higher maximum or threshold heating rate at which the support can be heated, associated therewith, viz 100° C./min. Thus, flash calcination can be applied provided sufficiently high space velocities are employed.

The process may include, in the calcination stage, initially heating the impregnated support until it reaches a calcination temperature, Tc. Thus, the heating up of the support to the calcination temperature, Tc, may be effected while maintaining a space velocity of at least 1,0 $m_n^3$/(kg $Co(NO_3)_2.6H_2O$)/h and an appropriate bed heating rate associated with the space velocity, as described hereinbefore. The process may also include, thereafter, maintaining the support at the calcination temperature, Tc, for a period of time, tc.

The heating rate may be controlled by controlling feed gas (air) pre-heaters through which the air required for fluidization and calcination passes and/or by controlling the calciner wall temperature. While the heating rate up to Tc can be linear, it is believed that enhanced activity may be obtainable if the heating rate is non-linear in order to tailor the release profiles of the nitrogen oxide(s) and water.

The period of time, tc, for which isothermal calcination is applied at the calcination temperature, Tc, may be between 0,1 and 20 hours, provided that the nitrogen content of the calcined catalyst is less then 1,0 m %.

The partially dried impregnated support from the support impregnation stage is preferably not stored and not heated or cooled prior to the subsequent fluidized bed calcination stage so that it passes into the fluidized bed calcination stage at substantially the same temperature at which it leaves the support impregnation stage. Thus, the partially dried impregnated support typically leaves the support impregnation stage at a temperature between 60° C. and 95° C., typically at around 75° C., and enters the fluidized bed calcination stage at about the same temperature, and without storage thereof between the stages. The fluidized bed calcination stage is thus preferably provided by a fluidized bed calciner connected directly to the vacuum drier.

The fluidized medium employed in the calciner is thus the air which is required for the calcination, and the linear air velocity through the calciner must naturally be sufficiently high to ensure proper fluidization.

The invention extends also to a catalyst when obtained by the process according to the third aspect of the invention, or when obtained by reducing the catalyst precursor of the first aspect of the invention or the catalyst precursor obtained by the process according to the second aspect of the invention.

The process is particularly suited to preparing a cobalt slurry phase Fischer-Tropsch catalyst, ie a catalyst suitable for catalyzing the conversion of a synthesis gas comprising carbon monoxide and hydrogen to hydrocarbon products, at elevated temperature and pressure.

The invention will now be described by way of example with reference to the following non-limiting examples and the accompanying diagrammatic drawings.

In the drawings

Figure 7:
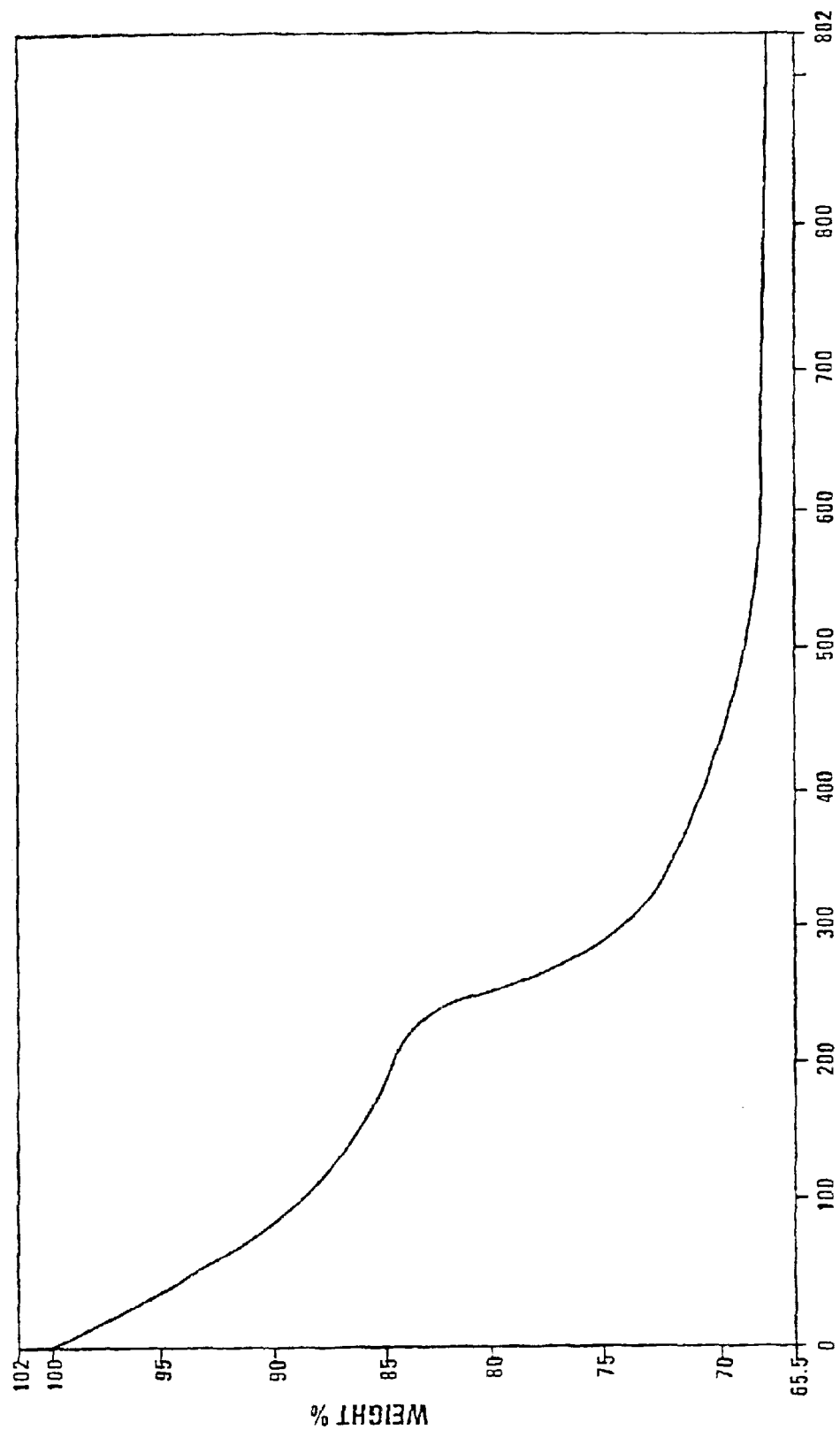
Figure 8:
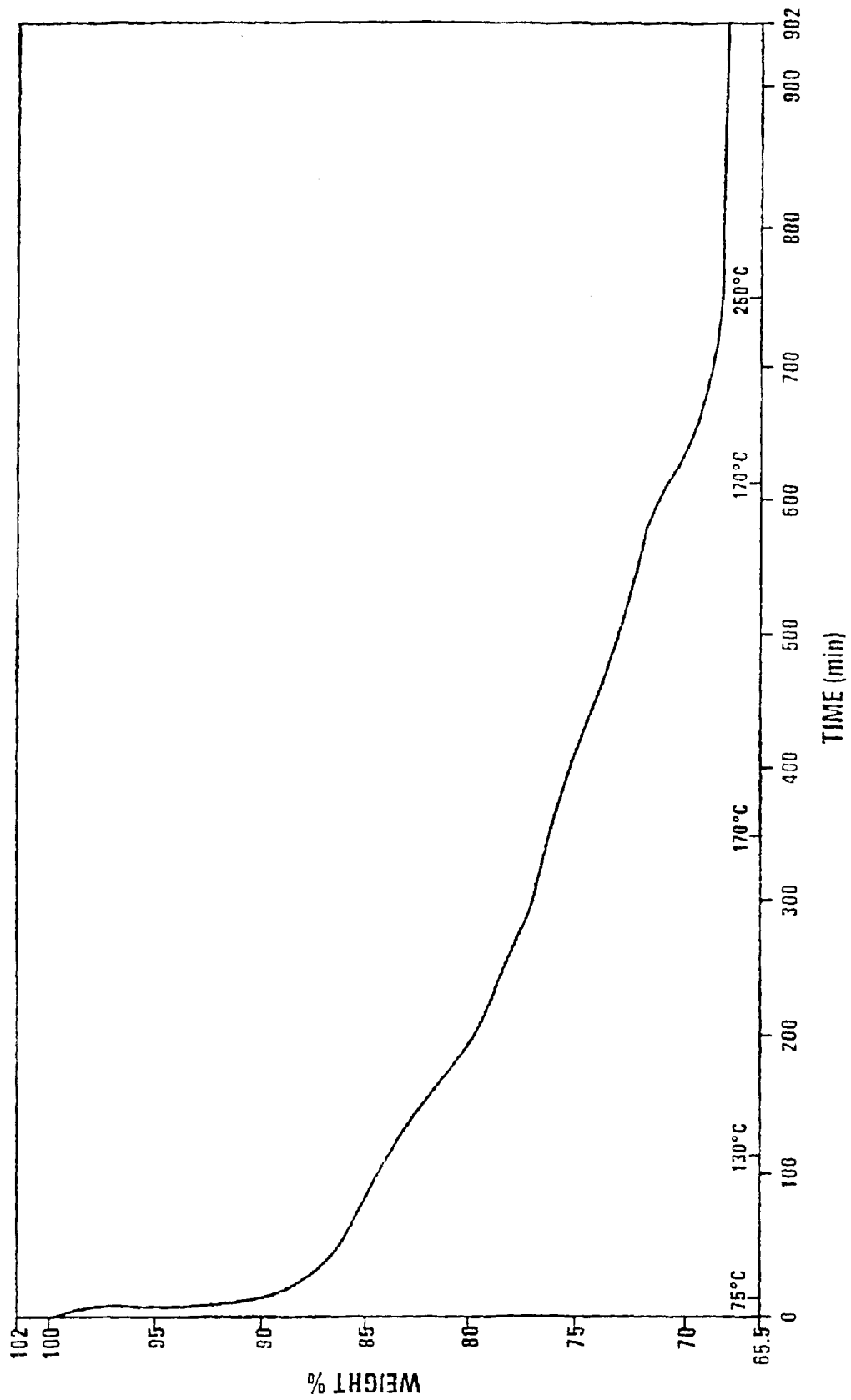
Figure 9:
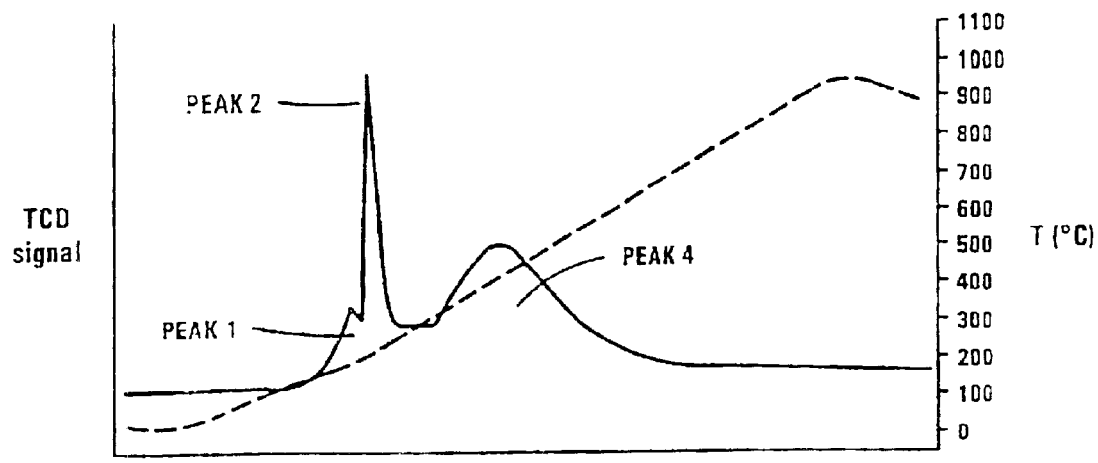
Figure 10:
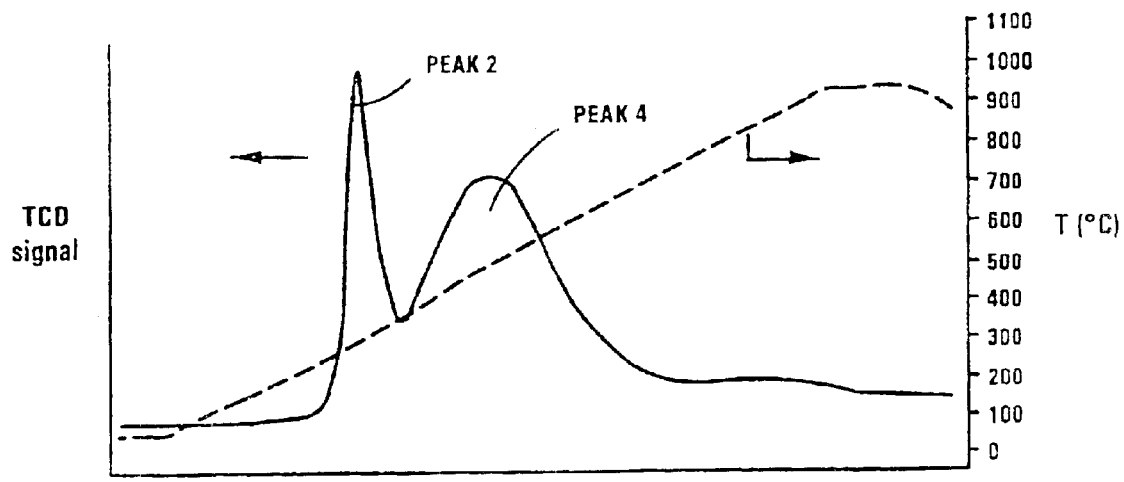

FIGS. 7 and 8 show thermogravimetric analyses (TGA) of catalyst B of Example 1, after support impregnation/vacuum drying and before calcination with air, with FIG. 7 showing the weight loss of catalyst B as a function of time, using a heating rate of 0,40° C./min and a hold time at 250° C. of 6 hours; and FIG. 8 showing the weight loss of catalyst B as a function of time, using a heating rate of 5° C./min from 30° C. to 75° C., a heating rate of 0,4° C./min from 75° C. to 130° C., a 4 hour hold time at 130° C., a heating rate of 0,17° C./min from 130° C. to 160° C., a heating rate of 0,7° C./min from 160° C. to 250° C., and a hold time at 250° C. of 4 hours;

FIG. 9 shows the Temperature Programmed Reduction pattern of Catalyst Q. The TPR experiment was performed using a heating rate of 10° C./min and a hydrogen/argon gas mixture with 10% hydrogen; and FIG. 10 shows the Temperature Programmed Reduction pattern of Catalyst R. The TPR experiment was performed using a heating rate of 10° C./min and a hydrogen/argon gas mixture with 10% hydrogen.

EXAMPLE 1

Figure 1:
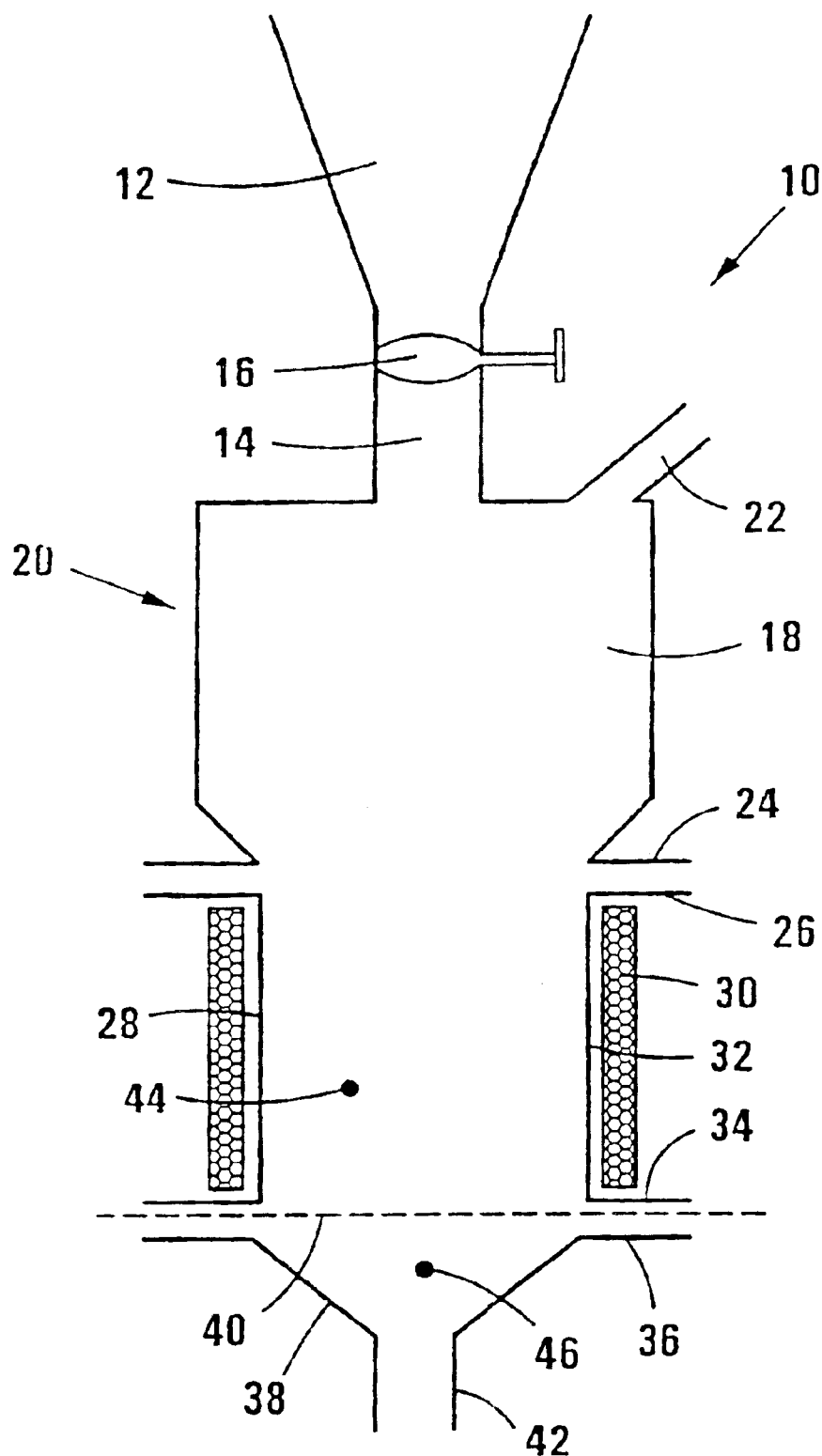
FIG. 1 shows, schematically, apparatus used for the preparation of the catalysts of Example 1, on a pilot plant scale.

A series of cobalt alumina-based Fischer-Tropsch catalysts, identified as A, B, C, D, E, G, H and I were prepared in a pilot plant scale apparatus as shown in FIG. 1. The catalysts were thus prepared using a fluidized bed calciner. Catalysts D, E, G, H and I are in accordance with the invention. Catalysts A, B and C have been included for comparison.

In FIG. 1, reference numeral 10 generally indicates pilot plant scale apparatus for preparing the Fischer-Tropsch catalysts.

The apparatus 10 includes a 100 dm$^3$ conical vacuum drier 12 having a discharge passageway fitted with a valve 16. The passageway 14 is connected directly to a disengagement section 18 of a fluidized bed calciner, which is generally indicated by reference numeral 20.

The calciner 20 includes a vent 22 leading from the section 18 to a scrubber (not shown). The section 18 is mounted, by means of flanges 24, 26, to a tubular component 28 providing a cylindrical calciner wall having an internal diameter of 350 mm and a height of 655 mm. A heating element 30 is located around the component 28, with a component 32 of a temperature indicator/controller being located between the element 30 and the component 28.

At its lower end, the component 28 is provided with a flange 34 which is mounted to the flange 36 of a funnel-shaped component 38. A filter 40 is sandwiched between the flanges 34, 36 and spans the passageway of the component 28. The component 38 has an air inlet 42 through which preheated air enters the calciner.

A temperature sensor/indicator 44 is located in the passageway of the component 28 to measure the temperature inside the fluidized bed (not shown) of dried particulate impregnated support material that forms on the filter 40. The temperature sensor/indicator 44 is located about 35 mm above the filter 40. A similar temperature sensor/indicator 46 is located below the filter 40.

In the apparatus 10, the vacuum drier 12, used for the impregnation and vacuum drying of the support, is thus directly connected to the fluidized bed calciner 20.

The catalysts were prepared by means of a slurry phase impregnation and vacuum drying procedure. The procedure was identical for all catalysts in this Example.

In each case, in a first impregnation and calcination step, a solution of 17,4 kg of $Co(NO_3)_2 \cdot 6H_2O$, 9,6 g of $(NH_3)_4Pt(N_3)_2$, and 11 kg of distilled water was mixed with 20,0 kg of a gamma alumina support (Puralox SCCa 5/150, pore volume of 0,48 ml/g, from Condea Chemie GmbH of Uberseering 40, 22297 Hamburg, Germany) by adding the support to the solution. The resultant slurry was added to the conical vacuum drier 12 and continuously mixed. The temperature of this slurry was increased to 60° C. after which a vacuum of 20 kpa(a) was applied. During the first 3 hours of the drying step, the temperature was increased slowly and reached 95° C. after 3 hours. After 3 hours the vacuum was decreased to 3–15 kpa(a). The impregnated catalyst support was dried for 9 hours, after which this impregnated catalyst support was immediately and directly loaded into the fluidized bed calciner 20. The temperature of the dried impregnated catalyst support was about 75° C. at the time of loading into the calciner. The loading took about 1 to 2 minutes, and the temperature inside the calciner remained at its set point of about 75° C. To obtain a catalyst with a cobalt loading of 30 gCo/100 gAl$_2$O$_3$, a second impregnation and drying step was performed. A solution of 9,4 kg of $Co(NO_3)_2 \cdot 6H_2O$, 15,7 g of $(NH_3)_4Pt(NO_3)_2$, and 15,1 kg of distilled water was mixed with 20,0 kg of impregnated and calcined material from the first impregnation and calcination step, by adding this solid intermediate material to the solution. The resultant slurry was added to the conical vacuum drier and continuously mixed. The temperature of this slurry was increased to 60° C. after which a vacuum of 20 kPa(a) was applied. During the first 3 hours of the drying step, the temperature was increased slowly and reached 95° C. after 3 hours. After 3 hours the vacuum was decreased to 3–15 kPa(a). The resultant impregnated catalyst support was dried for 9 hours, after which this impregnated catalyst support was immediately and directly loaded into the fluidized bed calciner. The temperature of the dried impregnated catalyst support was about 75° C. at the time of loading into the calciner. The loading took about 1 to 2 minutes, and the temperature inside the calciner remained at its set point of about 75° C.

The air space velocity in the calciner and the heating rate of the impregnated and dried material, from 75° C. to 250° C., were varied in an attempt to obtain a catalyst with maximum relative initial intrinsic activity. The hold time at 250° C. was kept constant at 6 hours during all catalyst preparations. The fluidized bed temperature (component 44 in FIG. 1) was monitored during the whole of each calcination cycle.

The conditions that were investigated during the direct fluidized bed calcination of the impregnated and dried material are set out in Table 1.

TABLE 1

Conditions used during fluidized bed calcination of dried impregnated supports.

| Catalyst * | Catalyst batch size (kg) | Heating rate (° C./min) | Air flow (kg/h) | Space velocity ** |
|---|---|---|---|---|
| A | 20 | 0.1 | 6.0 | 0.26 |
| B | 30 | 0.3 | 17.3 | 0.51 |
| C | 30 | 0.6 | 17.3 | 0.51 |
| D | 20 | 0.4 | 23.0 | 1.02 |
| E | 20 | 0.4 | 23.0 | 1.02 |
| G | 20 | 0.5 | 23.0 | 1.02 |
| H | 20 | 0.1 | 23.0 | 1.02 |
| I | 30 | 100 | — | 1000 |

\* All catalysts had the composition 30Co/0, 075Pt/100Al$_2$O$_3$ (given on a mass basis)
\*\* The space velocity is expressed as m$^3_n$ air/(kg Co(NO$_3$)$_2$.6H$_2$O)/h The nitrogen content of each of these Pilot Plant prepared catalysts was less or equal to 0,5 wt %, as given in Table 2.

TABLE 2

Nitrogen content of catalysts A, B, C, D, and I, after calcination.

| Catalyst | Nitrogen content (m %) |
|---|---|
| A | 0.50 |
| B | 0.45 |
| C | 0.45 |
| D | 0.48 |
| I | 0.50 |

EXAMPLE 2

A series of cobalt alumina-based Fischer-Tropsch catalysts, identified as K, L, M, and O, were prepared on a laboratory scale, applying the same procedures used during the pilot plant scale catalyst preparations described in Example 1, but starting with 50 g of support instead of 20 kg. The amounts of the other chemicals used were also scaled down using the ratio 0,05/20. These catalysts were also prepared using fluidized bed calcination. The preparation of these catalysts was effected in laboratory equipment similar to the apparatus 10. Catalysts L and M are in accordance with the invention. Catalysts K and O have been included for comparison.

The conditions during fluidized bed calcination of the laboratory prepared catalyst supports are set out in Table 3.

TABLE 3

Conditions used during fluidized bed calcination of dried impregnated supports.

| Catalyst * | Mass (g) | Heating Rate (° C./min) | Space velocity ** |
|---|---|---|---|
| K | 50 | 1.3 | 0.41 |
| L | 50 | 0.3 | 0.76 |
| M | 50 | 1.0 | 0.76 |
| O | 50 | 8.0 | 0.76 |

\* All catalysts had the composition 30Co/0, 075Pt/100Al$_2$O$_3$, on a mass basis.
\*\* The space velocity is expressed as m$^3_n$ air/(kg Co(NO$_3$)$_2$.6H$_2$O)/h.

EXAMPLE 3

A cobalt catalyst P, which is not in accordance with the invention was prepared by means of slurry impregnation. In a first impregnation and calcination step, a solution of 43, 68 g of Co(NO$_3$)$_2$.6H$_2$O, 0,024 g of (NH$_3$)$_4$Pt(NO$_3$)$_2$, and 50 ml of distilled water was mixed with 50 g of a gamma alumina support (Puralox SCCa 5/150, pore volume of 0,48 ml/g, from Condea Chemie GmbH of Uberseering 40, 22297 Hamburg, Germany) by adding the support to the solution. The resultant slurry was added to a rotarvap and continuously mixed. The temperature of this slurry was increased to 60° C. after which a vacuum of 25 kpa(a) was applied. During the first 3 hours of the drying step, the temperature was increased slowly and reached 95° C. after 3 hours. After 3 hours the vacuum was decreased to 5 kPa (a). The impregnated catalyst support was dried for 9 hours, after which the catalyst support was immediately calcined. The calcination was performed in a static furnace calciner at 250° C., without flushing air over the sample. To obtain a catalyst with a cobalt loading of 30 gCo/100 gAl$_2$O$_3$, a second impregnation and calcination step was performed. A solution of 23,51 kg of Co(NO$_3$)$_2$.6H$_2$O, 0,039 g of (NH$_3$)$_4$Pt(NO$_3$)$_2$, and 50 ml of distilled water was mixed with 50 g of impregnated and calcined material from the first impregnation and calcination step, by adding this solid intermediate material to the solution. The slurry was added to a rotarvap and continuously mixed. The temperature of this slurry was increased to 60° C. after which a vacuum of 25 kPa(a) was applied. During the first 3 hours of the drying step, the temperature was increased slowly and reached 95° C. after 3 hours. After 3 hours the vacuum was decreased to 5 kPa (a). The impregnated catalyst support was dried for 9 hours, after which the catalyst support was immediately calcined. The calcination was performed in a static furnace calciner at 250° C., without flushing air over the sample.

EXAMPLE 4

Catalysts A, H, and P were tested for Fischer-Tropsch synthesis performance. The experimental data, as well as the Fischer-Tropsch conditions, are presented in Table 4.

Prior to the laboratory micro slurry reactor Fischer-Tropsch synthesis runs at realistic Fischer-Tropsch conditions, the calcined catalyst precursors were reduced in the laboratory using a standard laboratory reduction procedure (heating rate of 1° C./min from 25 up to 425° C., 16 hours at 425° C., GHSV of 200 ml$_n$ hydrogen/(g cat.hour), 1 bar pure hydrogen), unloaded and coated with Fischer-Tropsch wax.

Having applied a known cobalt based Fischer-Tropsch kinetic equation, such as:

$$r_{FT}=(k_{FT}P_{H2}P_{CO})/(1+KP_{CO})^2$$

the Arrhenius derived pre-exponential factor $A_{FT}$ (ie $A_{FT}= k_{FT}/(e^{-Ea/RT})$) was estimated for each of the reported runs. The relative intrinsic specific Fischer-Tropsch activity is defined as ((pre-exponential factor of catalyst x)/(pre-exponential factor of catalyst A))*100, in which catalyst x is the catalyst of the specific examples, ie catalysts H and P.

Figure 2:
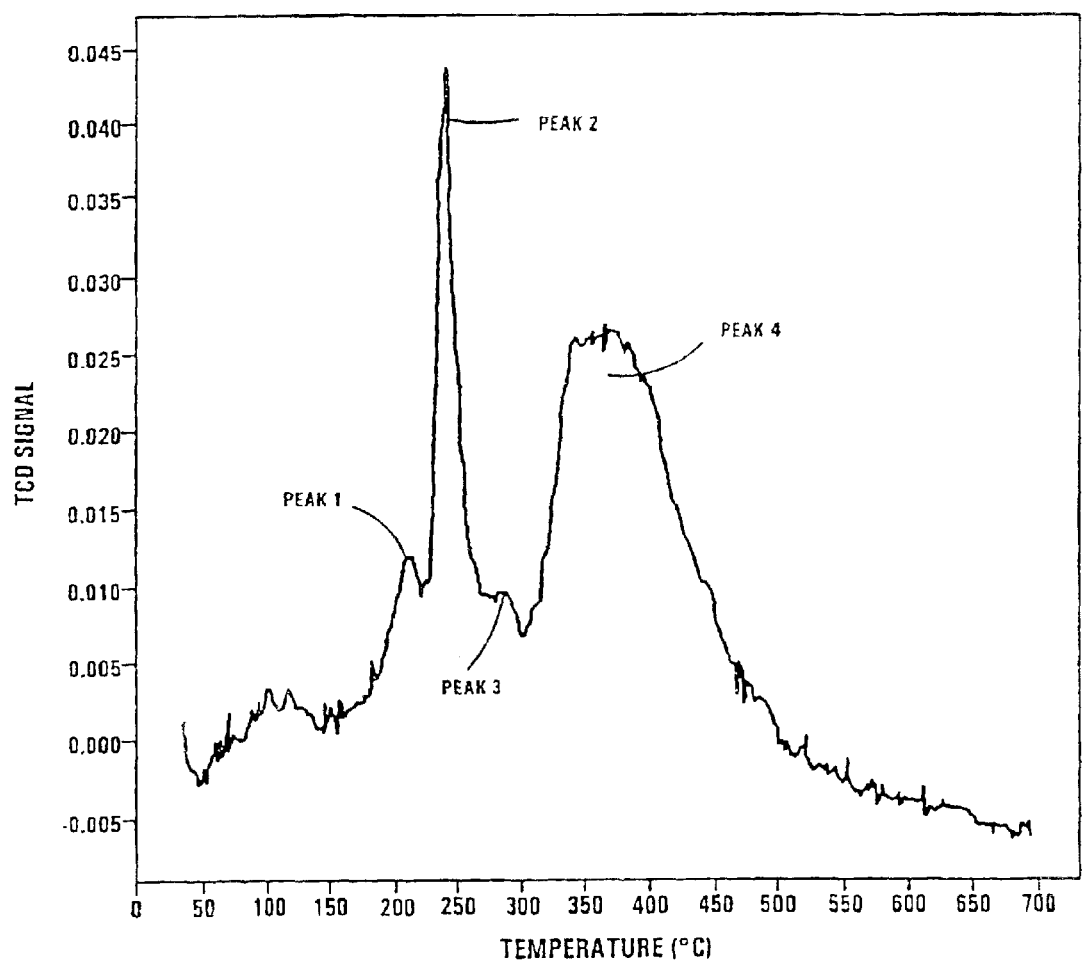
FIG. 2 shows the Temperature Programmed Reduction pattern of catalyst P. The TPR experiment was performed using a heating rate of 10° C./min and a hydrogen/argon gas mixture having 10% hydrogen.
Figure 3:
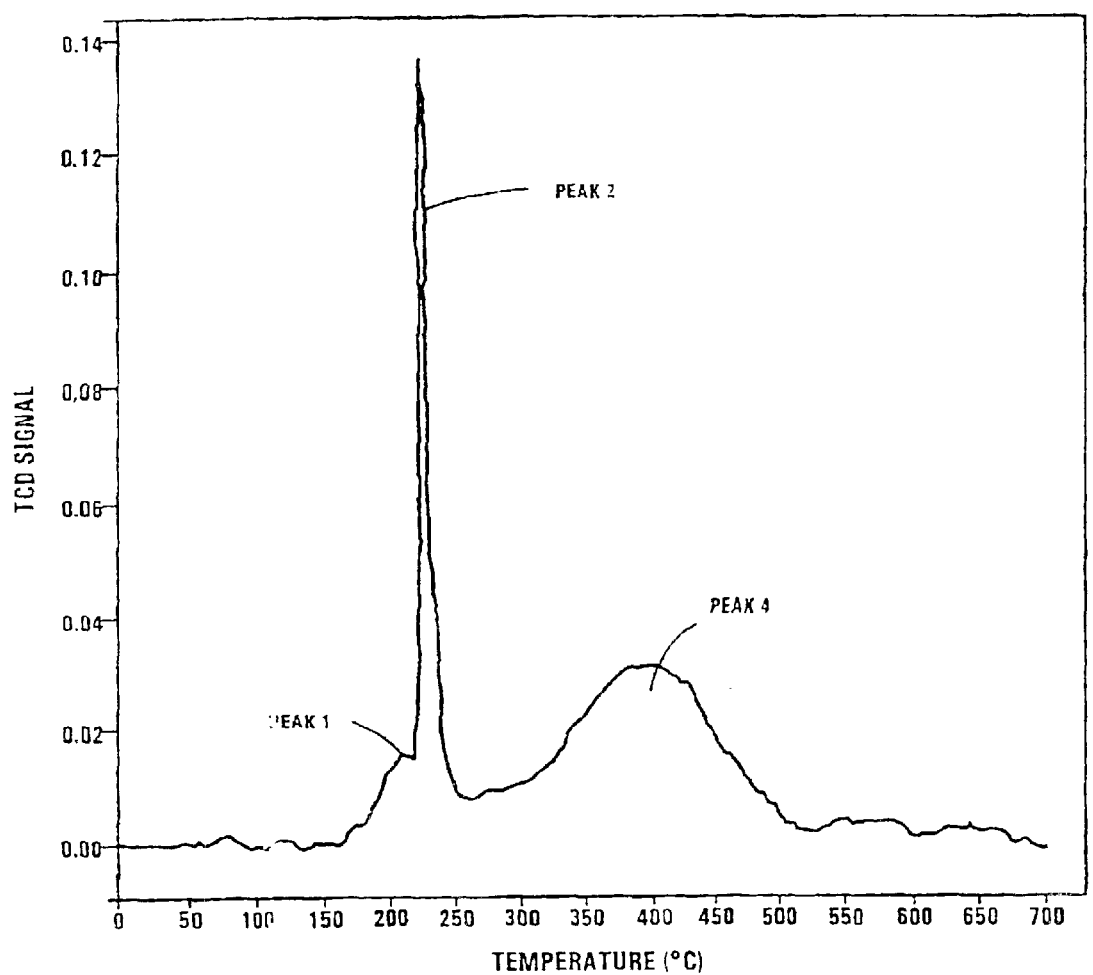
FIG. 3 shows the Temperature Programmed Reduction pattern of catalyst H; The TPR experiment was performed using a heating rate of 10° C./min and a hydrogen/argon gas mixture having 10% hydrogen.

Temperature programmed reduction (TPR) experiments were performed on catalysts H and P (FIGS. 2 and 3), using a heating rate of 10° C./min and a hydrogen/argon gas mixture having 10 vol % hydrogen.

The Fischer-Tropsch synthesis performance results show that catalyst H is much more active (ie relative intrinsic FT factor of 138) than catalyst P (ie relative intrinsic FT factor of 62). The TPR patterns also show a clear difference between these two catalysts. The differences are typified by the following parameters:

1. The ratio of the peak heights of peak 2 and peak 4;
2. The width of peak 2 at half height;
3. The presence/absence of peak 3.

The TPR pattern of catalyst H is typical for a supported cobalt catalyst containing reducible cobalt oxide with a formula-unit of $CoO_aH_b$, where $a \geq 1{,}7$ and $b \geq 0$, whilst the TPR pattern of catalyst P displays the presence of the undesired $Co_3O_4$ spinel phase.

It can thus be concluded that a catalyst which is properly calcined will have a TPR pattern typical for the desired cobalt oxide phase with the formula-unit $CoO_aH_b$, where $a \geq 1{,}7$ and $b \geq 0$, as well as a desired high relative intrinsic Fischer-Tropsch activity.

TABLE 4

Fischer-Tropsch synthesis performance of catalysts A, H, and P.

| | Catalyst | | |
|---|---|---|---|
| Run analysis | A 140F | H 174F | P 153F |
| Synthesis conditions | | | |
| Calcined catalyst mass (g) | 20.1 | 20.9 | 19.2 |
| Reactor temperature (° C.) | 218.0 | 220.4 | 220.4 |
| Reactor pressure (bar) | 20.1 | 19.9 | 20.0 |
| Time on stream (h) | 15.3 | 15.0 | 15.0 |
| Feed gas composition: | | | |
| $H_2$ (vol %) | 51.4 | 52.9 | 52.6 |
| CO (vol %) | 27.8 | 27.4 | 26.7 |
| $CO_2$ (vol %) | 0.68 | 0.60 | 0.59 |
| Syngas ($H_2$ + CO) space velocity ($m^3_n$/kg cat/h) | 3.24 | 3.73 | 3.59 |
| Reactor partial pressures | | | |
| H2 (bar) | 6.74 | 5.50 | 8.14 |
| CO (bar) | 3.69 | 2.80 | 3.91 |
| $H_2$ O (bar) | 3.06 | 4.40 | 2.23 |
| $CO_2$ (bar) | 0.29 | 0.27 | 0.15 |
| Synthesis performance | | | |
| % syngas conversion | 47.6 | 62.3 | 34.2 |
| Relative intrinsic specific Fischer-Tropsch activity | 100 | 138 | 62 |
| % C-atom $CH_4$ selectivity | 9.6 | 5.2 | 12.0 |
| % CO of total amount of CO converted to $CO_2$ | 3.6 | 2.3 | 0.6 |

EXAMPLE 5

Catalysts A, B, C, D, E, G, H, K, L, M, and O, all prepared by using fluidized bed calcination, were tested for Fischer-Tropsch synthesis performance. The experimental data, as well as the Fischer-Tropsch conditions, are presented in Tables 5 and 6.

The catalysts were reduced and tested as described in Example 4. The relative intrinsic Fischer-Tropsch activity factors were also calculated as described in Example 4.

Figure 4:
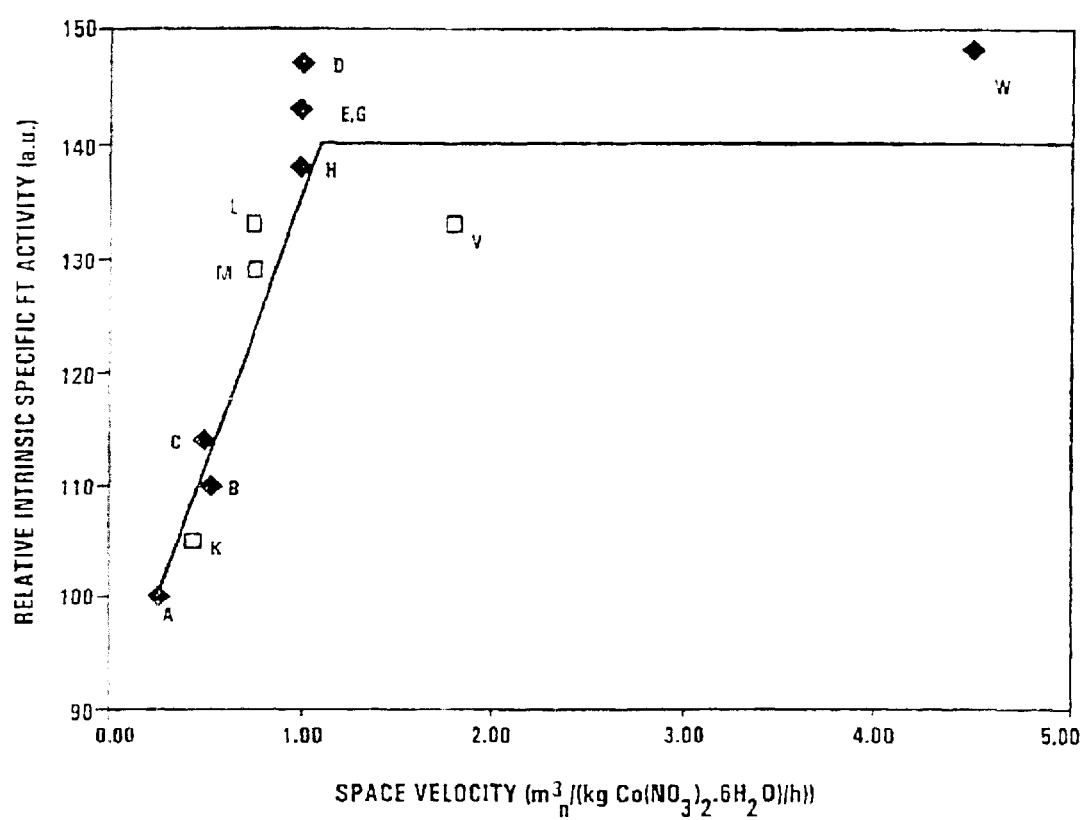
FIG. 4 shows the relative intrinsic specific Fischer-Tropsch activities of catalysts of Examples 1, 2 and 8, as a function of the space velocity during fluidized bed calcination thereof.

The relative intrinsic specific Fischer-Tropsch activities of all the catalysts were plotted as a function of the space velocity during fluidized bed calcination (FIG. 4) The activities of catalysts A, B, C, D, E, G, H, K, L and M increased linearly to a relative intrinsic specific Fischer-Tropsch activity of about 140 at a space velocity of 1,02 $m_n^3$/(kg $Co(NO_3)$$_2$.$6H_2O$)/h, after which it is expected to level off at a relative intrinsic specific Fischer-Tropsch activity of about 140.

It is believed that the positive influence of the space velocity on the presence of the preferred, ex calcination cobalt oxide phase and on the catalyst performance is due to the fact that, at higher space velocities, the maximum $NO_x$ and water concentrations around the catalyst particles during calcination is lower.

Figure 5:
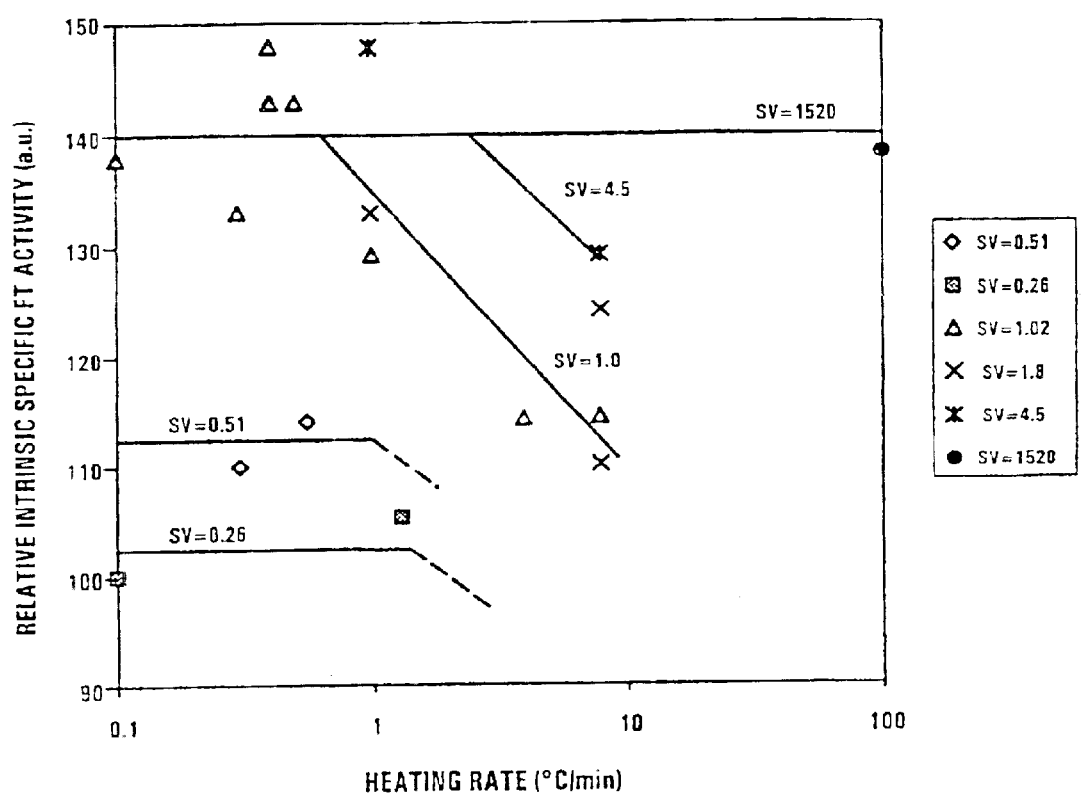
FIG. 5 shows the relative intrinsic specific Fischer-Tropsch activities of catalysts of Examples 1, 2 and 8, as a function of the heating rate during fluidized bed calcination thereof.

The relative intrinsic specific Fischer-Tropsch activities of catalysts A, B, C, D, E, G, H, I, K, L, M and O were also plotted as function of the heating rate during fluidized bed calcination (FIG. 5). At a fixed air space velocity, it can be concluded that the intrinsic catalyst Fischer-Tropsch activity is not influenced by variations in the heating rate within the range 0,1° C. to 0,5° C./min. It appears that at high heating rates the initial intrinsic activity may decline (eg catalyst O), as also indicated by the dotted extrapolations. It is believed that this is caused by increased $NO_x$ and water concentrations around the catalyst due to the rapid decomposition of cobalt nitrates at high heating rates. Included in this FIG. 5 is the initial (ie 15 hours on stream under realistic synthesis conditions) intrinsic FT activity of catalyst I. Catalyst I shows that if the space velocity is extremely high, ie 1000 $m^3n$/(kg $Co(NO_3)_2$.$6H_2O$)/h, flash calcination, ie a heating rate of 100° C./min, can be tolerated.

Figure 6:
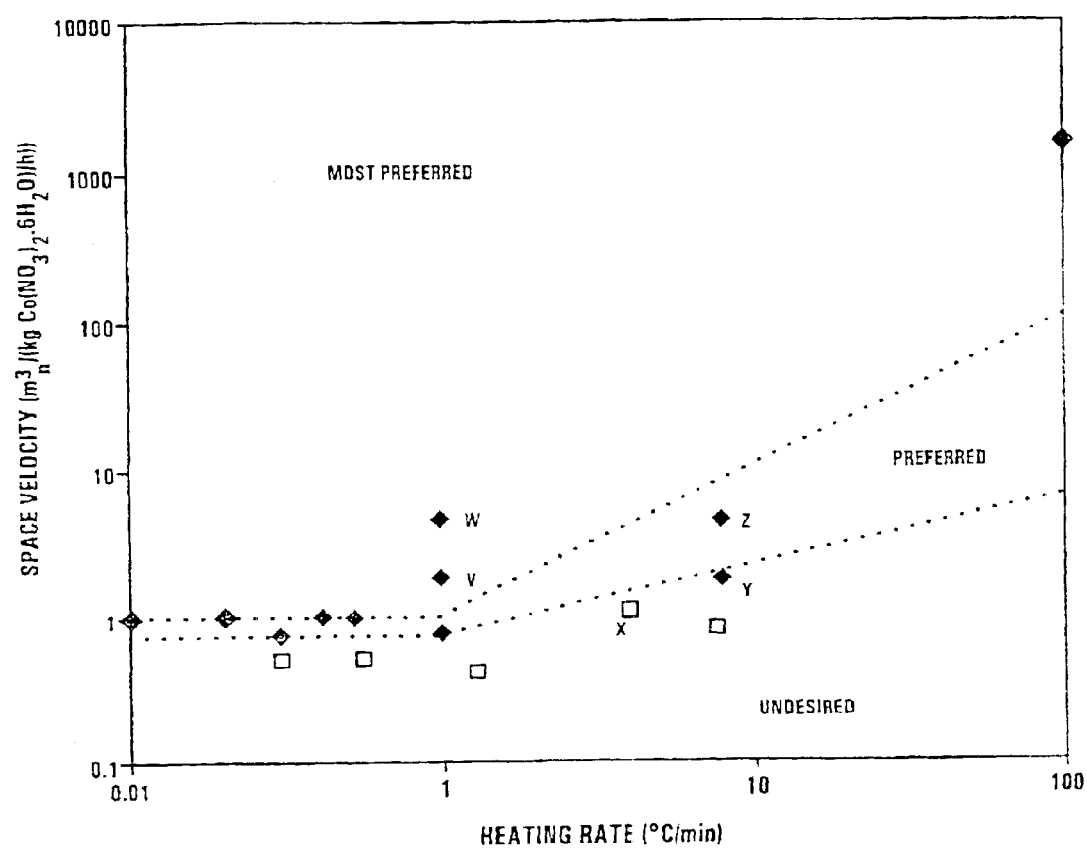
FIG. 6 shows the undesired, preferred, and most preferred catalyst Fischer-Tropsch productivity regions as functions of the air space velocity and the heating rate during fluidized bed calcination.

In FIG. 6, it can be seen that the right combination of heating rates and air space velocities has to be selected to obtain a catalyst with the desired intrinsic Fischer-Tropsch activity.

TABLE 5

Fischer-Tropsch synthesis performance of catalysts B, C, D, E, G, and I.

| | Catalyst | | | | | |
|---|---|---|---|---|---|---|
| Run analysis | B 131F | C 124F | D 147F | E 163F | G 169F | I 265$ |
| Synthesis conditions | | | | | | |
| Calcined catalyst mass (g) | 20.1 | 20.9 | 21.3 | 20.5 | 19.9 | 20.7 |
| Reactor temperature (° C.) | 220.8 | 219.8 | 220.2 | 219.3 | 216.9 | 220.1 |
| Reactor pressure (bar) | 20.0 | 20.3 | 20.2 | 20.0 | 20.0 | 20.3 |
| Time on stream (h) | 15.0 | 15.0 | 15.0 | 15.5 | 15.0 | 15.3 |
| Feed gas composition: | | | | | | |
| $H_2$ (vol %) | 50.0 | 51.8 | 47.4 | 53.2 | 52.7 | 55.5 |
| CO (vol %) | 28.6 | 27.2 | 30.4 | 27.2 | 27.3 | 27.5 |
| $CO_2$ (vol %) | 0.76 | 0.66 | 0.64 | 0.61 | 0.56 | 0.50 |
| Syngas ($H_2$ + CO) space velocity ($m^3_n$/kg cat/h) | 3.15 | 3.16 | 2.97 | 3.76 | 3.77 | 2.4 |
| Reactor partial pressures | | | | | | |
| $H_2$ (bar) | 5.65 | 5.75 | 4.56 | 5.70 | 6.20 | 3.90 |
| CO (bar) | 3.26 | 3.23 | 3.31 | 3.10 | 3.30 | 2.30 |
| $H_2O$ (bar) | 3.94 | 4.03 | 4.68 | 4.20 | 3.90 | 6.10 |
| $CO_2$ (bar) | 0.29 | 0.27 | 0.26 | 0.24 | 0.19 | 0.40 |
| Synthesis performance | | | | | | |
| % syngas conversion | 56.2 | 58.4 | 62.3 | 60.1 | 55.5 | 76.8 |
| Relative intrinsic specific Fischer-Tropsch activity | 110 | 114 | 148 | 143 | 143 | 138 |
| % C-atom $CH_4$ selectivity | 7.0 | 2.8 | 1.4 | 4.0 | 3.9 | 3.4 |
| % CO of total amount of CO converted to $CO_2$ | 2.3 | 2.2 | 1.8 | 1.5 | 1.2 | 3.9 |

TABLE 6

Fischer-Tropsch synthesis performance of catalysts K, L, M, and O.

| | Catalyst | | | |
|---|---|---|---|---|
| Run analysis | K 55(SR3)1 | L 55(SR3)1 | M 155F | O 57(SR3)1 |
| Synthesis conditions | | | | |
| Calcined catalyst mass (g) | 12.7 | 12.1 | 20.0 | 11.7 |
| Reactor temperature | 219.0 | 220.5 | 220.4 | 219.8 |

TABLE 6-continued

Fischer-Tropsch synthesis performance of catalysts K, L, M, and O.

| | Catalyst | | | |
|---|---|---|---|---|
| Run analysis | K 55(SR3)1 | L 55(SR3)1 | M 155F | O 57(SR3)1 |
| (° C.) | | | | |
| Reactor pressure (bar) | 20.0 | 20.5 | 20.0 | 20.5 |
| Time on stream (h) | 15.3 | 15.0 | 15.8 | 15.0 |
| Feed gas composition: | | | | |
| H2 (vol %) | 58.8 | 59.6 | 53.3 | 57.7 |
| CO (vol %) | 30.3 | 29.5 | 26.3 | 31.1 |
| CO2 (vol %) | 0.6 | 0.8 | 0.6 | 0.6 |
| Syngas ($H_2$ + CO) space velocity ($m^3_n$/kg cat/h) | 1.94 | 2.08 | 3.52 | 2.14 |
| Reactor partial pressures | | | | |
| $H_2$ (bar) | 3.49 | 2.74 | 5.33 | 3.46 |
| CO (bar) | 1.81 | 1.45 | 2.64 | 1.84 |
| $H_2O$ (bar) | 4.62 | 5.20 | 4.49 | 4.95 |
| $CO_2$ (bar) | 0.26 | 0.42 | 0.27 | 0.26 |
| Synthesis performance | | | | |
| % syngas conversion | 73.1 | 80.5 | 64.1 | 73.5 |
| Relative intrinsic specific Fischer-Tropsch activity | 105 | 133 | 129 | 114 |
| % C-atom $CH_4$ selectivity | 4.1 | 5.1 | 6.4 | 5.6 |
| % CO of total amount of CO converted to $CO_2$ | 2.8 | 4.1 | 2.3 | 2.3 |

EXAMPLE 6

The bulk of the cobalt nitrate decomposition, ie the bulk of the $NO_x$ release, occurs between 130° C. and 160° C., as can be seen from FIG. 7. For suppression of the $NO_x$ peak maximum, ie to enhance initial activity, tailoring of this $NO_x$ release profile, ie adoption of a non-linear heating rate, was investigated with the following as target: maximum removal of residual moisture and crystal waters prior to ca 130° C., to be followed by a smoothing out of the $NO_x$ release between 130° C. and 160° C. This was simulated by means of a TGA experiment, in which a hold time at 130° C., a slow heating rate between 130° C. and 160° C., and a fast heating rate between 160° C. and 250° C. was used, as shown in FIG. 8. The $NO_x$ release was found to be spread out over a much longer period of time, and the maximum $NO_x$ concentration around the catalyst was thus lower.

EXAMPLE 7

Catalyst Q was prepared in similar fashion to Catalyst I of Example 1. The TPR pattern of Catalyst Q can be seen in FIG. 9.

Part of this catalyst sample Q was calcined additionaly at 450° C., ie at a temperature higher than specified in the invention, to obtain Catalyst R. This was done to ensure the presence of $Co_3O_4$ in this particular catalyst sample R. The TPR of Catalyst R can be seen in FIG. 10.

It can be concluded from the relative hydrogen consumption per reduction step, as calculated from the areas under peaks 1, 2 and 4 in FIGS. 9 and 10, that Catalyst R, which has thus not been prepared according to the invention, mainly contained $Co_3O_4$. Catalyst Q, however, which has been prepared according to the invention, is predominantly CoO(OH). This also emerges from Table 7.

TABLE 7

Relative hydrogen consumption for different steps in the reduction of Catalysts Q and R.

| | Catalyst Q | | Catalyst R | |
|---|---|---|---|---|
| Reaction | Peak no | Mole $H_2$ * | Peak no | Mole $H_2$ * |
| $3CoO(OH) + O,5H_2 \rightarrow Co_3O_4 + 2H_2O$ | 1 | 0.4 | | |
| $Co_3O_4 + H_2 \rightarrow 3CoO + H_2O$ | 2 | 1.1 | 2 | 1.1 |
| $3CoO + 3H_2 \rightarrow 3Co + 3H_2O$ | 4 | 3.0 | 4 | 3.0 |

* The amount of hydrogen was calculated from the areas under the respective reduction peaks.

EXAMPLE 8

A series of alumina supported cobalt based Fischer-Tropsch catalysts were prepared on a laboratory scale, applying the same procedures as used in Example 2. The calcination conditions that were used are shown in Table 8.

Catalysts V, W and Z are in accordance with the invention. Catalysts X and Y have been included for comparison.

TABLE 8

Conditions used during fluidised bed calcination of dried impregnated supports.

| Catalyst | Mass (g) | Heating rate (° C./min) | Space velocity ** |
|---|---|---|---|
| V | 50 | 1.0 | 1.8 |
| W | 50 | 1.0 | 4.5 |
| X | 50 | 4.0 | 1.0 |
| Y | 50 | 8.0 | 1.8 |
| Z | 50 | 8.0 | 4.5 |

* All catalysts had the composition $30Co/0075Pt/100Al_2O_3$, on a mass basis.
** The space velocity is expressed as $m^3_n$ air/(kg Co $(NO_3)_2.6H_2$ O)/h The catalysts were reduced and tested for Fischer-Tropsch synthesis performance as described in Example 4. The relative intrinsic Fischer-Tropsch activity factors were also calculated as described in Example 4. The data are presented in Table 9 as well as in FIGS. 4 to 6.

TABLE 9

Fischer-Tropsch synthesis conditions and performance of catalysts V, W, X, Y, and Z, as tested in a laboratory CSTR micro slurry reactor.

| run analysis | V 103SR3 | W 279F | X 347F | Y 101SR3 | Z 95SR3 |
|---|---|---|---|---|---|
| Synthesis conditions | | | | | |
| Calcined catalyst mass (g) | 12.7 | 19.8 | 19.4 | 20 | 12.3 |
| Reactor temperature (° C.) | 220 | 222 | 220 | 220 | 220 |
| Reactor pressure (bar) | 20.5 | 20.3 | 20.0 | 20.5 | 20.5 |
| Time on stream (h) | 15.0 | 15.0 | 15.0 | 15.0 | 15.0 |
| Feed gas composition: | | | | | |
| $H_2$ (vol %) | 55 | 53.7 | 52.4 | 55 | 56 |
| CO (vol %) | 33 | 27.6 | 27.8 | 33 | 32 |
| $CO_2$ (vol %) | 0.6 | 0.6 | 0.58 | 0.8 | 0.8 |
| Syngas ($H_2$ + CO) space velocity ($m^3_n$/kg cat/h) | 3.7 | 4.2 | 3.7 | 3.3 | 4.0 |
| Reactor partial pressures | | | | | |
| $H_2$ (bar) | 5.87 | 5.39 | 6.36 | 6.03 | 6.15 |
| CO (bar) | 3.55 | 2.75 | 3.42 | 3.61 | 3.37 |

TABLE 9-continued

Fischer-Tropsch synthesis conditions and performance of catalysts V, W, X, Y, and Z, as tested in a laboratory CSTR micro slurry reactor.

| run analysis | V 103SR3 | W 279F | X 347F | Y 101SR3 | Z 95SR3 |
|---|---|---|---|---|---|
| $H_2O$ (bar) | 4.22 | 4.91 | 3.69 | 3.91 | 3.97 |
| $CO_2$ (bar) | 0.16 | 0.28 | 0.20 | 0.21 | 0.23 |
| Synthesis performance | | | | | |
| % syngas conversion | 54.7 | 65.0 | 53.0 | 52.3 | 53.2 |
| Relative intrinsic specific Fischer-Tropsch activity | 133 | 147 | 113 | 111 | 129 |
| % C-atom $CH_4$ selectivity | — | 3.6 | 5.0 | 5.0 | 6.1 |
| % CO of total amount of CO converted to $CO_2$ | 0.4 | 2.1 | 1.2 | 0.9 | 1.2 |

EXAMPLE 9

Two catalysts (AA and AB) were prepared by means of incipient wetness impregnation. 50 grams of alumina, with a pore volume of 0,48 ml/g, was impregnated with 24 ml of an aqueous cobalt nitrate solution, also containing ammonium platinum nitrate. After impregnation, the resultant intermediate was dried and calcined, in a fluidised bed calcination unit, up to 250° C. The exact calcination conditions are given in Table 10. After calcination, the intermediate was impregnated for a second time, by means of incipient wetness impregnation, and calcined in the same manner as during the first impregnation and calcination step. The second impregnation and calcination was performed to obtain a catalyst with the composition: $30Co/0,075Pt/100Al_2O_3$.

Catalyst AA is in accordance with the invention. Catalyst AB has been included for comparison.

TABLE 10

Conditions used during fluidised bed calcination of dried impregnated supports.

| Catalyst | Mass (g) | Heating rate (° C./min) | Air flow (1/min) | Space velocity ** |
|---|---|---|---|---|
| AA | 50 | 1.0 | 1.7 | 1.8 |
| BB | 50 | 1.0 | 0.3 | 0.3 |

* All catalyst had the composition $30Co/0, 075Pt/100Al_2O_3$, on a mass basis.
** The space velocity is expressed as $m^3_n$ air/(kg $Co(NO_3)_2.6H_2O$)/h The catalysts were reduced and tested for Fischer-Tropsch synthesis performance as described in Example 4. The relative intrinsic Fischer-Tropsch activity factors were also calculated as described in Example 4. The data are presented in Table 11.

TABLE 11

Fischer-Tropsch synthesis conditions and performance of catalysts AA and AB, as tested in a laboratory CSTR micro slurry reactor.

| run analysis | AA 292F | BB 107SR3 |
|---|---|---|
| Synthesis conditions | | |
| Calcined catalyst mass (g) | 20.1 | 13.1 |
| Reactor temperature (° C.) | 220 | 220 |

TABLE 11-continued

Fischer-Tropsch synthesis conditions and performance of catalysts AA and AB, as tested in a laboratory CSTR micro slurry reactor.

| run analysis | AA 292F | BB 107SR3 |
|---|---|---|
| Reactor pressure (bar) | 20.0 | 20.5 |
| tome on stream (h) | 15.0 | 15.0 |
| Feed gas composition: | | |
| $H_2$ (vol %) | 54.0 | 51 |
| CO (vol %) | 27.4 | 27 |
| $C)_2$ (vol %) | 0.8 | 1.5 |
| Syngas ($H_2$ + CO) space velocity ($m^3_n$/kg cat/h) | 4.2 | 3.4 |
| Reactor partial pressures | | |
| $H_2$ (bar) | 6.12 | 6.96 |
| CO (bar) | 3.17 | 3.73 |
| $H_2O$ (bar) | 4.21 | 3.27 |
| $CO_2$ (bar) | 0.28 | 0.20 |
| synthesis performance | | |
| % syngas conversion | 58.3 | 44.3 |
| Relative intrinsic specific Fischer-Tropsch activity | 140 | 86 |
| % C-atom $CH_4$ selectivity | 3.9 | 5.0 |
| % CO of total amount of CO converted to $CO_2$ | 1.5 | 0.5 |

The results show that for cobalt catalysts prepared by incipient wetness impregnation procedures, calcination conditions according to the invention also have to be applied to obtain a catalyst with improved Fischer-Tropsch synthesis performance.

EXAMPLE 10

Thermogravimetric analysis (TGA) in air of catalyst Q, after the second impregnation and calcination thereof, showed a weight loss of 3,5–4,0 m % between 250° C. and 550° C. Assuming that during the TGA the cobalt compound $Co_3O_4$ is formed, it can be calculated which cobalt compound was present after standard catalyst calcination at 250° C. The compounds CoO, CoOOH or $Co_2O_3.H_2O$, $Co(NO_3)_2$, and/or $Co_2O_3$ are possible candidates. The expected weight change during the conversion of these compounds into $Co_3O_4$ is presented in Table 12. It can be concluded from these data that the cobalt compound present after calcination at 250° C., using the conditions according to the invention, is predominantly CoOOH or $Co_2O_3.H_2O$.

TABLE 12

Mass change of cobalt compounds during decomposition to $Co_3O_4$.

| Compound | Mass change during decomposition to $CO_3O_4$ (%) | Mass change if compound is present on catalyst with 20 m % cobalt (%) |
|---|---|---|
| CoO | +6.6 | +1.8 |
| CoOOH or $Co_2O_3.H_2O$ | −13 | −4.0 |
| $Co(NO_3)_2$ | −56 | −35 |
| $Co_2O_3$ | −3.2 | −0.9 |

What is claimed is:

1. A cobalt catalyst precursor which includes a catalyst support impregnated with cobalt, with all reducible cobalt being present in the support as supported cobalt oxide of formula-unit $CoO_aH_b$, where $a \geq 1.7$ and $b>0$.

2. A cobalt catalyst precursor according to claim 1, wherein all the reducible cobalt is present as $Co_2O_3.H_2O$ or $CoO(OH)$.

3. A cobalt catalyst precursor according to claim 1, wherein all the reducible cobalt is present as a mixture of $Co_3O_4$ and $CoO(OH)$ or $Co_2O_3.H_2O$.

4. A cobalt catalyst precursor according to claim 1, which contains between 5 g Co/100 g support and 70 g Co/100 g support.

5. A process for preparing a cobalt catalyst precursor, which process includes in a support impregnation stage, impregnating a particulate porous catalyst support with a cobalt salt, and partially drying the impregnated support, with the resultant partially dried impregnated support containing residual moisture; and in a calcination stage, calcining the partially dried impregnated support to obtain the cobalt catalyst precursor, with the calcination being effected in air at a temperature between 95° C. and 400° C, and by using an air space velocity and a support heating rate such that all reducible cobalt is present in the support of the precursor as a supported cobalt oxide of formula-unit $CoO_aH_b$, where $a \geq 1.7$ and $b>0$.

6. A process for preparing a cobalt catalyst, which process includes preparing a cobalt catalyst precursor by the process as claimed in claim 5; and in a reduction stage, reducing the cobalt catalyst precursor, to obtain the cobalt catalyst.

7. A process for preparing a cobalt catalyst precursor according to claim 5 wherein, in the calcination stage, the calcination includes passing hot air over and around the partially dried impregnated support, thereby drying the impregnated support further by removal of the residual moisture present therein; and calcining the resultant dried impregnated support by decomposition of the cobalt salt into decomposition products comprising oxide(s) and any water of hydration, with the decomposition products being released in vapour form.

8. A process for preparing a cobalt catalyst precursor according to claim 7, which includes diluting or removing the decomposition products obtained during the calcination.

9. A process for preparing a cobalt catalyst precursor according to claim 7, wherein the cobalt salt is cobalt nitrate so that the oxides that are formed as decomposition products are nitrogen oxides; wherein the calcination is performed in a fluidized bed calciner; and wherein after calcination, the nitrogen concentration in the catalyst precursor is less than 1.0 m %.

10. A process for preparing a cobalt catalyst precursor according to claim 9, wherein, during the calcination in the fluidized bed, the heating rate of the impregnated support and the space velocity of the air are controlled such that the residual moisture in the support is first driven off, whereafter decomposition of the cobalt nitrate is effected.

11. A process for preparing a cobalt catalyst precursor according to claim 10, wherein the air space velocity is at least 1.0 $m_n^3$/(kg $Co(NO_3)_2.6H_2O$)/h; and wherein the heating rate complies with the following criteria: when the air space velocity=$_{1.0}$ $m_n^3$/(kg $Co(NO_3)_2.6H_2O$)/h, the heating rate $\leq 1°$ C./min; however, when the air space velocity>1.0 $m_n^3$/(kg $Co(NO_3)_2.6H_2O$)/h used, heating rates up to x° C./min, where $x \geq 1$, are allowed.

12. A process for preparing a cobalt catalyst precursor according to claim 10, which includes, in the calcination stage, initially heating the impregnated support until it reaches a calcination temperature, Tc, and thereafter, maintaining it at the calcination temperature, Tc, for a period of time, tc.

13. A process for preparing a cobalt catalyst precursor according to claim 12, wherein the heating rate up to the calcination temperature, Tc, is non-linear.

14. A process for preparing a cobalt catalyst precursor according to claim 12, wherein the period of time, tc, for which isothermal calcination is applied at the calcination temperature, Tc, is between 0.1 and 20 hours.

15. A process for preparing a cobalt catalyst precursor according to claim 9, wherein the partially dried impregnated support from the support impregnation stage is not stored and not heated or cooled prior to the subsequent fluidized bed calcination stage so that it passes into the fluidized bed calcination stage at substantially the same temperature at which it leaves the support impregnation stage.

16. A process for preparing a cobalt catalyst precursor, which process includes in a support impregnation stage, impregnating a particulate porous catalyst support with a cobalt salt, and partially drying the impregnated support, with the resultant partially dried impregnated support containing residual moisture; and in a calcination stage, calcining the partially dried impregnated support by passing air over and around the partially dried impregnated support, and heating the impregnated support to a temperature between 95° C. and 400° C. to obtain the cobalt catalyst precursor, wherein the heating rate of the impregnated support and the space velocity of the air are controlled such that the residual moisture in the support is first driven off, whereafter decomposition of the cobalt salt into decomposition products comprising oxide(s) and any water of hydration, is effected, and wherein all reducible cobalt then is present in the support of the precursor as a supported cobalt oxide of formula-unit $CoO_aH_b$, where $a \geq 1.7$ and $b>0$.

17. A process for preparing a cobalt catalyst, which process includes preparing a cobalt catalyst precursor by the process as claimed in claim 16; and in a reduction stage, reducing the cobalt catalyst precursor, to obtain the cobalt catalyst.

18. A process for preparing a cobalt catalyst precursor according to claim 16, wherein the decomposition products are released in vapour form, with the process including diluting or removing the decomposition products.

19. A process for preparing a cobalt catalyst precursor according to claim 16, wherein the cobalt salt is cobalt nitrate so that the oxides that are formed as decomposition products are nitrogen oxides; wherein the calcination is performed in a fluidized bed calciner; and wherein after calcination, the nitrogen concentration in the catalyst precursor is less than 1.0 m %.

20. A process for preparing a cobalt catalyst precursor according to claim 19, wherein the air space velocity is at least 1.0 $m_n^3$/(kg $Co(NO_3)2.6H_2O$)/h; and wherein the heating rate complies with the following criteria: when the air space velocity=$_{1.0}$ $m_n^3$/(kg $Co(NO_3)_2.6H_2O$)/h, the heating rate $\leq 1°$ C./min; however, when the air space velocity>1.0 $m_n^3$/(kg $Co(NO_3)_2.6H_2O$)/h used, heating rates up to x° C./min, where $x \geq 1$, are allowed.

21. A process for preparing a cobalt catalyst precursor according to claim 19, which includes, in the calcination stage, initially heating the impregnated support until it reaches a calcination temperature, Tc, and thereafter, maintaining it at the calcination temperature, Tc, for a period of time, tc.

22. A process for preparing a cobalt catalyst precursor according to claim 21, wherein the heating rate up to the calcination temperature, Tc, is nonlinear.

23. A process for preparing a cobalt catalyst precursor according to claim 21, wherein the period of time, tc, for which isothermal calcination is applied at the calcination temperature, Tc, is between 0.1 and 20 hours.

24. A process for preparing a cobalt catalyst precursor according to claim 19, wherein the partially dried impregnated support from the support impregnation stage is not stored and not heated or cooled prior to the subsequent fluidized bed calcination stage so that it passes into the fluidized bed calcination stage at substantially the same temperature at which it leaves the support impregnation stage.

* * * * *